United States Patent
Han et al.

(10) Patent No.: US 7,337,580 B2
(45) Date of Patent: Mar. 4, 2008

(54) WEIGHT CHANGE INDICATING APPARATUS

(76) Inventors: Kehan Han, 2551 Rouen, Montreal (CA) H2K 1M7; Wenqian Han, 2551 Rouen, Montreal (CA) H2K 1M7; Kedu Han, 4714 Mason Ct., Sugar Land, TX (US) 77479

( * ) Notice: Subject to any disclaimer, the term of this patent is extended or adjusted under 35 U.S.C. 154(b) by 427 days.

(21) Appl. No.: 10/904,645

(22) Filed: Nov. 20, 2004

(65) Prior Publication Data

US 2006/0107591 A1    May 25, 2006

(51) Int. Cl.
*A01G 9/04* (2006.01)
(52) U.S. Cl. .............................. 47/71; 73/73
(58) Field of Classification Search ............. 47/65.5, 47/71; 73/73, 74, 75, 76, 77
See application file for complete search history.

(56) References Cited

U.S. PATENT DOCUMENTS

| 3,134,451 A | 5/1964 | Hanssen | 177/225 |
| 3,759,338 A * | 9/1973 | Petersen et al. | 177/173 |
| 3,894,591 A * | 7/1975 | Ackeret | 177/126 |
| 4,020,417 A | 4/1977 | Brehob et al. | 324/65 R |
| 4,462,475 A | 7/1984 | Kushmuk | 177/173 |
| 4,514,722 A | 4/1985 | Batcheler et al. | 340/604 |
| D312,586 S * | 12/1990 | Stephens | D10/92 |
| 5,079,869 A | 1/1992 | Dawson | 47/67 |
| 5,209,109 A * | 5/1993 | Chamoulaud | 73/73 |
| 5,721,400 A * | 2/1998 | Haraldsson et al. | 177/256 |
| 5,802,764 A | 9/1998 | Nucci | 47/67 |
| 6,198,398 B1 | 3/2001 | Velasquez | 340/604 |
| 6,202,479 B1 | 3/2001 | Frybarger | 73/73 |
| 6,295,865 B1 | 10/2001 | Cherry | 73/73 |
| 6,564,509 B1 | 5/2003 | Zahner | 47/67 |
| 6,608,260 B2 * | 8/2003 | Montagnino et al. | 177/25.11 |
| 6,700,395 B1 | 3/2004 | Perry | 324/696 |

* cited by examiner

*Primary Examiner*—David Parsley (57) ABSTRACT

An apparatus for use under an object utilizes a weighing mechanism and an adjustable indicating system for monitoring weight change. The apparatus may be particularly adapted for monitoring soil moisture level in a pot holding houseplants. The apparatus provides a guide for a caretaker to restore the adequate soil moisture level by balancing the weight change.

2 Claims, 7 Drawing Sheets

WEIGHT CHANGE INDICATING APPARATUS

BACKGROUND OF INVENTION

This invention relates to a weight change indicating apparatus. More particularly, this invention relates to an apparatus and method for indicating moisture level changes in soil of a potted houseplant and providing a guide to water and restore proper moisture level in the soil.

It is well known that proper soil moisture level is critical for maintaining healthy growth of potted houseplants. To keep the soil moist, a common practice is to water houseplants weekly or biweekly. However, the change of soil moisture level at regular time intervals may vary significantly due to the variation in atmospheric conditions such as temperature and humidity. Therefore it is usually difficult to estimate how much water should be added for restoring proper soil moisture level. Either overwatering or underwatering may prevent the houseplant from reaching its potential and even shorten the life of the houseplant.

A variety of devices have been developed for monitoring soil moisture level of potted houseplants. Most devices use sensing probes for monitoring soil moisture level. For example, U.S. Pat. No. 4,020,417 to Brehob et al, U.S. Pat. No. 4,514,722 to Batcheler et al, U.S. Pat. No. 6,198,398 to Velasquez, U.S. Pat. No. 6,202,479 to Frybarger and U.S. Pat. No. 6,700,395 to Perry, all disclose different moisture sensing probes which can alert caretakers when the soil is too dry or too wet. However, the uses of these devices have several disadvantages. These devices may be dimensioned to penetrate the full depth of the soil to give an indication of the soil moisture level. Repeatedly inserting probes may hurt roots. Moreover, the moisture level at top, middle, and bottom layer of the soil may be different. But the soil moisture levels detected by the probes are confined to the area where the probes are located. Moreover, probes of these types may malfunction due to a buildup of foreign matter on, or corrosion of, the metal probe surface which contacts the soil. Finally, these devices are usually set to sense a predetermined low or high moisture level and trigger a visual or audible signal. Before the soil moisture level reaches to the threshold, these devices cannot indicate the actual changes of water content in the soil.

Other methods have also been proposed for monitoring soil moisture level by sensing weight change in the soil of the potted houseplant. For example, U.S. Pat. No. 5,079,869 to Dawson, U.S. Pat. No. 5,802,764 to Nucci, and U.S. Pat. No. 6,564,509 to Zahner, all disclosed a weight-responsive device for indicating changes in weight of a suspended pot holding houseplants. However, these devices are designed only for suspended houseplants. U.S. Pat. No. 6,295,865 to Cherry discloses an electronic device with a processor and a power supply for monitoring weight change of a potted houseplant. However, the processor and other electronic components used in the device are complicated and expensive, thus represent a significant financial investment.

SUMMARY OF INVENTION

The present invention provides an apparatus for monitoring weight change of an object, especially for monitoring changes in soil moisture level in a pot holding a houseplant.

The apparatus comprises a conventional weighing mechanism and an adjustable indicating system with a independently adjustable indicating component. The apparatus is placed under the pot holding the houseplant. After the houseplant is properly watered, the indicating component can be adjusted to a balanced position to continuously monitor the water content loss in the soil of the potted houseplant.

It is an object of the present invention to provide an apparatus which continuously monitor water content of the soil in a pot holding a houseplant when the soil moisture level gradually reduces from wet to dry. By indicating the water content loss due to evaporation and use by the houseplant, a caretaker may add appropriate amount of water into the pot as indicated to restore the proper moisture level in the soil. The apparatus further indicates if the soil has been overwatered.

It is another object of the present invention to provide an apparatus and-methed for continuously monitor weight change of an object.

It is another object of the present invention to provide an apparatus for indicating weight change that is easy to use and easy to maintain.

It is another object of the present invention to provide an apparatus for indicating weight change that is of durable and reliable construction.

Other objects, features and advantages of the present invention will become more readily apparent from the following detailed description of the preferred embodiments when considered with the attached drawings and appended claims.

DETAILED DESCRIPTION

Figure 1:
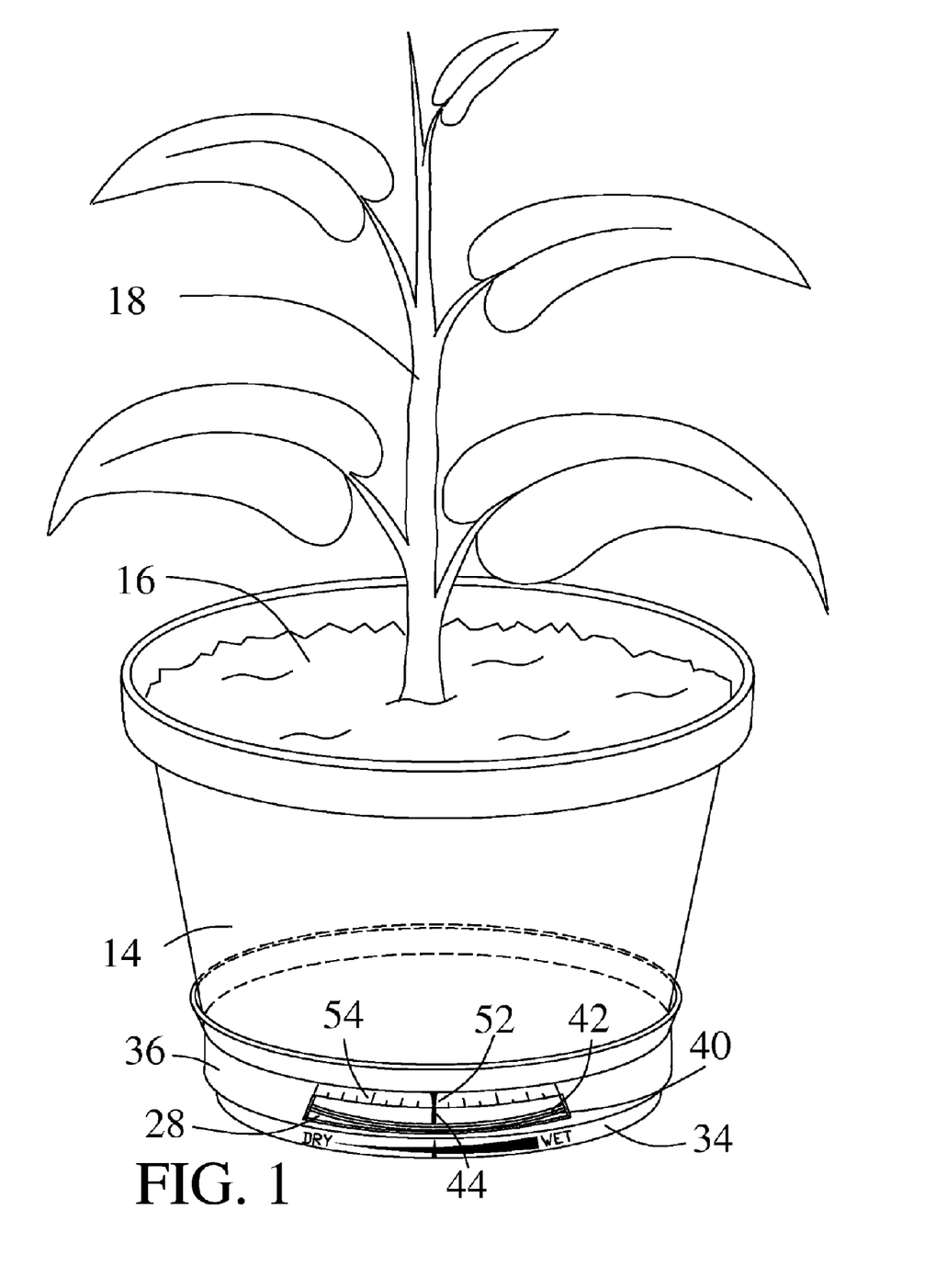
FIG. 1 is a perspective view of a first preferred embodiment of the present invention in use.
Figure 2:
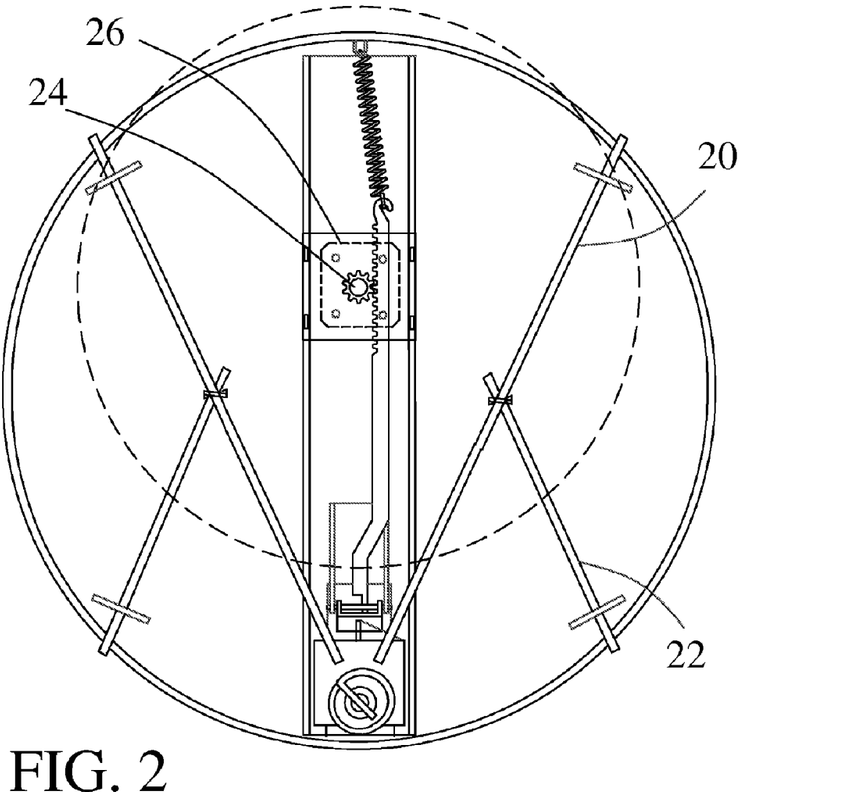
FIG. 2 is a top plan view, with top parts broken away, of the apparatus of FIG. 1, showing the internal structure of a conventional weighing mechanism employed in the apparatus.

Referring to the drawings wherein like numerals refer to like parts, FIG. 1 shows a first preferred embodiment adapted for indicating moisture level in a pot 14 holding soil 16 and a houseplant 18. In general, the apparatus embodies the principles of a conventional weighing mechanism and an adjustable indicating system. The weighing mechanism is of the type disclosed in U.S. Pat. No. 3,134,451 and the disclosure of which is incorporated herein and made a part hereof However, the weighing mechanism may be of any other conventional type. The weighing mechanism includes a conventional weight sensing system and a conventional deflection transmitting system. As shown in FIG. 2, the weight sensing mechanism consists of a pair of primary levers 20 and a pair of secondary levers 22 arranged in interconnected fashion. The deflection transmitting system includes a conventional rack and pinion arrangement which is imparted to a vertically rotatable shaft 24. These elements of the weighing mechanism are conventional and shown merely to provide a general understanding of the structure and do not constitute a critical part of the invention. The adjustable indicatingsystem comprises a disc 40 and an adjustable indicating component. The disc 40, as shown in circular dotted line in FIG. 2, is mounted on a support plate 26 which is turned by shaft 24. The indicating system is so positioned in the apparatus that a portion of the indication system exposes through a side opening 28. Therefore the indication system can easily be reached and adjusted.

Figure 3:
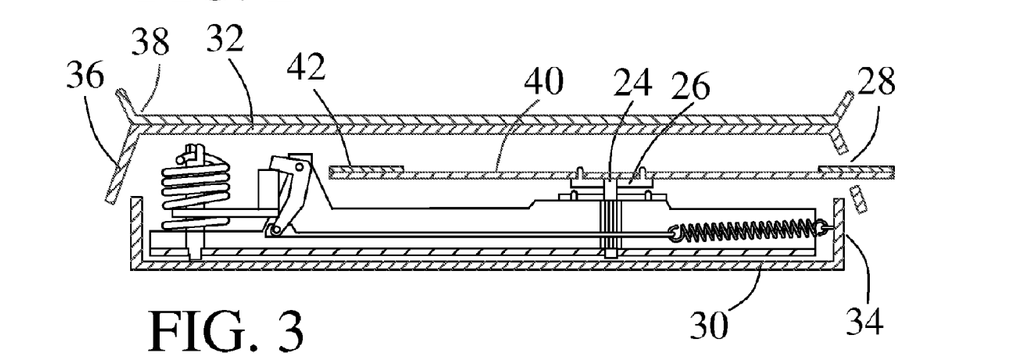
FIG. 3 is a side cross-sectional view of the apparatus of FIG. 1, showing the structures of the weighing mechanism and an adjustable indicating system.

As shown in FIG. 3, the weighing mechanism is structurally mounted within a bottom base 30 and an upper weighing platform 32. The shape of bottom base 30 may be of any configuration but in the present invention it is illustrated with a planar circular configuration. The bottom base 30 comprises substantially a flat horizontal bottom and an upstanding peripheral sidewall 34 at an angle perpendicular with respect to the flat horizontal bottom. The weighing platform 32 is formed with a flat upper weighing surface and an integral peripheral skirt 36 extending downwardly around the base. The weighing platform 32 fits telescopically over bottom base 30. A plate 38 with an upwardly extending peripheral rim may be mounted on the upper weighing surface of platform 32 as a pot base for receiving the pot holding the houseplant. Alternatively, the plate 38 may be integrally formed with weighing platform 32. The weighing platform 32 rests on primary levers 20 and secondary levers 22 of the weight sensing system which is supported by bottom base 30. The weighing platform 32 may be retained in position on bottom base 30 by means of coiled tension springs (not shown) connecting platform 32 and bottom base 30. In the apparatus shown in FIG. 3, side opening 28 is provided on skirt 36 of platform 32. Alternatively, side opening 28 may be provided on sidewall 34 of bottom base 30, or formed with a side recess on skirt 36 of platform 32 and/or a side recess on corresponding side on peripheral sidewall 34 of bottom base 30.

Figure 4A:
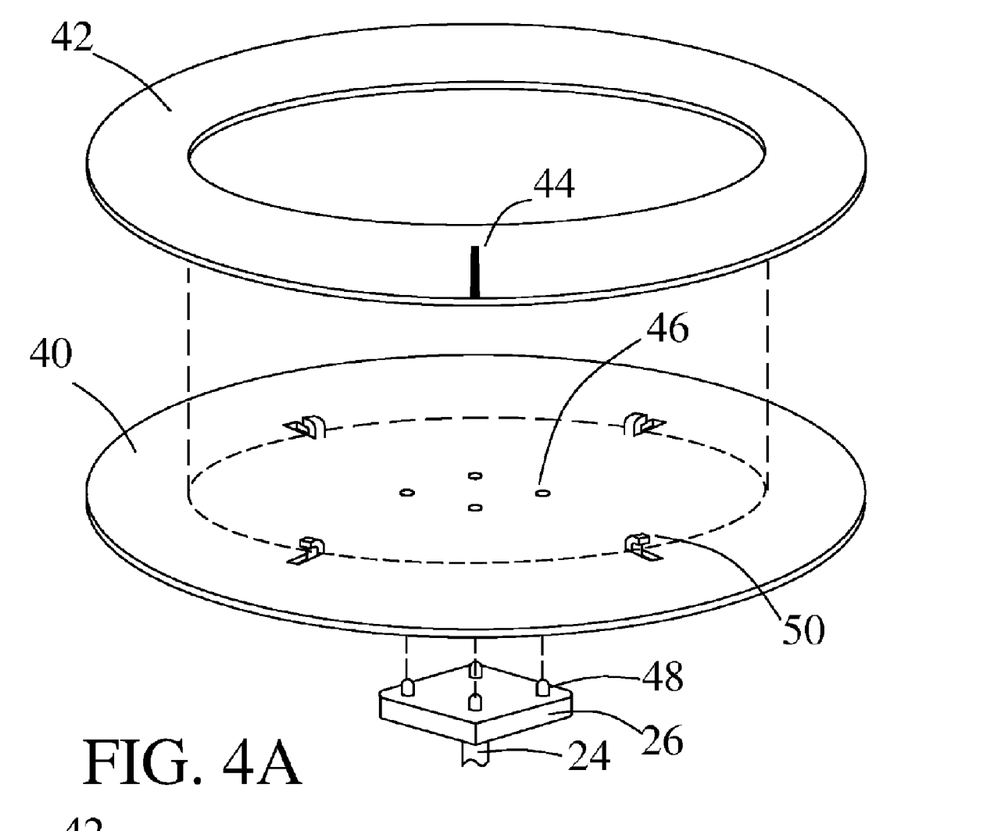
FIG. 4A is an exploded view of the indicating system of the apparatus of FIG. 1.
Figure 4B:
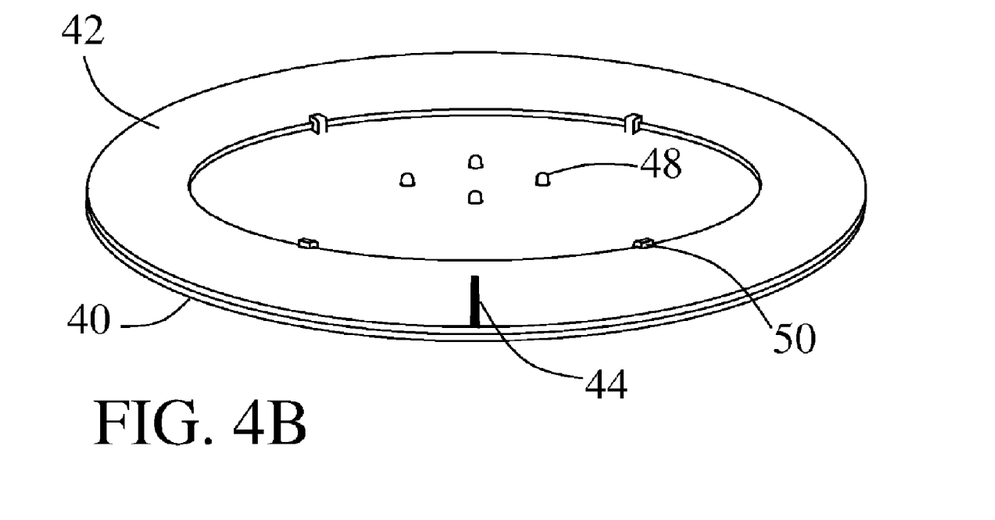
FIG. 4B is a front elevation view, with parts combined, of the indicating system of FIG. 4A.
Figure 5:
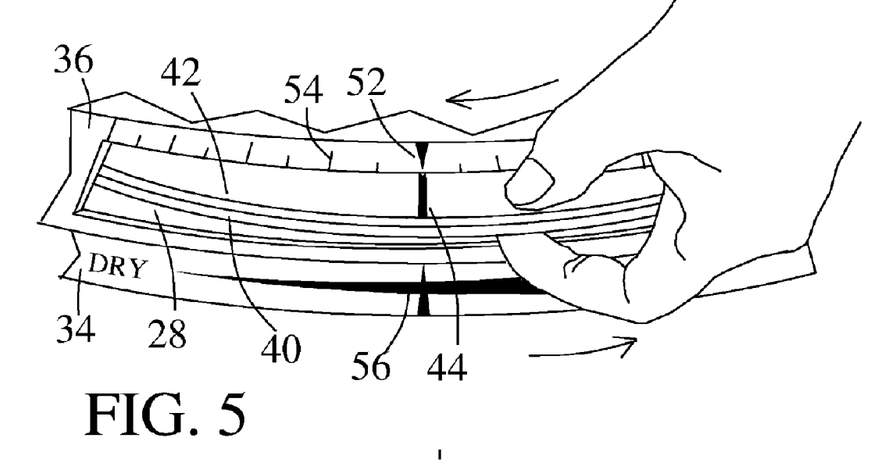
FIG. 5 is a fragmentary perspective view of the apparatus of FIG. 1, showing the indicating component being adjusted to the balanced position.

The structure of the adjustable indicating system is novel. FIG. 4-5 illustrate the adjustable indicating system in the first preferred embodiment of the present invention. The indicating system comprises disc 40 and a washer-like plate 42 having an indicator 44 thereon. The size of outer diameter of washer-like plate 42 is substantially the same as disc 40. The disc 40 is mounted on support plate 26 by four holes 46 which receive four corresponding protrusions 48 on support plate 26. The disc 40 comprises a plurality of mounting members 50 which rotatably mount washer-like plate 42 on disc 40. The mounting members 50 may be formed by making U-shape cuts on disc 40. The U-shape cuts are bent upwardly so that the lower portions of the U-shape cuts substantially coincide with the inner diameter of washer-like plate 42. The upper portions of the U-shape cuts are further bent outwardly to rotatably mount washer-like plate 42. Integration of all the components of the indicating system is shown in FIG. 4B. Therefore washer-like plate 42 may be rotated freely on disc 40 and indicator 44 may be adjusted to and retained at any position along the periphery of disc 40. The adjustment of washer-like plate 42 is independent of the movement of disc 40. It is to be understood that other like means and techniques may be employed for the purpose of rotatably mounting washer-like plate 42 on disc 40. Such means and techniques are well known to those skilled in the art.

As shown in FIG. 5, a marker 52 indicating a balanced position may be provided on skirt 36 above opening 28. Weighing indicia 54 may be calibrated and positioned on both sides of the marker. The indicia on one side indicate weight decrease and the indicia on the other side indicate weight increase. The weighing indicia 54 can be calibrated in any suitable measurements such as ounces, pounds, grams or kilograms. Explanatory indicia 56 may be arbitrarily calibrated and positioned on sidewall 34 below opening 28.

In use, the apparatus is placed under pot 14 which holds soil 16 and the houseplant 18. After houseplant 18 is properly watered, the indicator 44 is manually adjusted to the balanced position indicated by marker 52. This is done by placing a thumb above washer-like plate 42 and an index finger under disc 40 and sliding the outer edges of washer-like plate 42 against disc 40, as shown in FIG. 5. The arrows shown in FIG. 5 indicate the directions of the movements of the thumb and the index finger, respectively. When the soil loses water due to evaporation and use by the houseplant, the indicator 44 deflects and the amount of water loss can be easily checked. When the houseplant is properly watered, the indicator 44 deflects towards the balanced position, indicating that the houseplant receives enough water. If more water is added, the indicator 44 deflects towards the opposite direction and indicates the possibility of overwatering.

Figure 6:
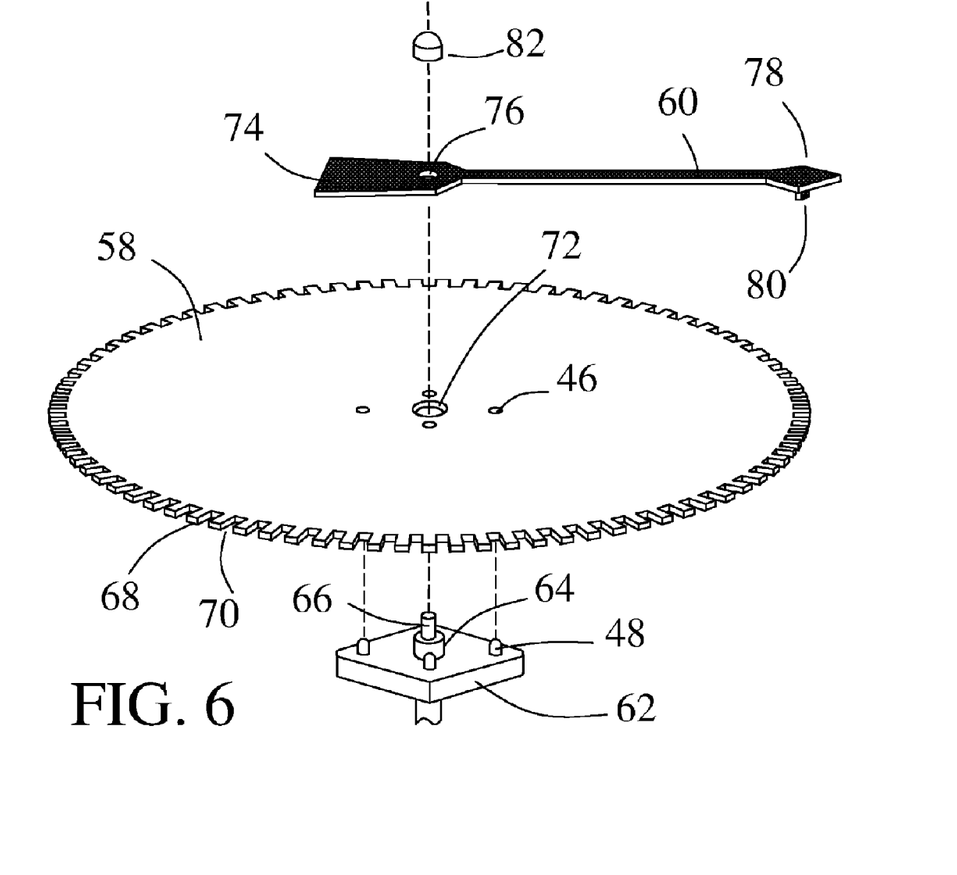
FIG. 6 is an exploded view of an adjustable indicating system in a second preferred embodiment of the present invention.
Figure 7:
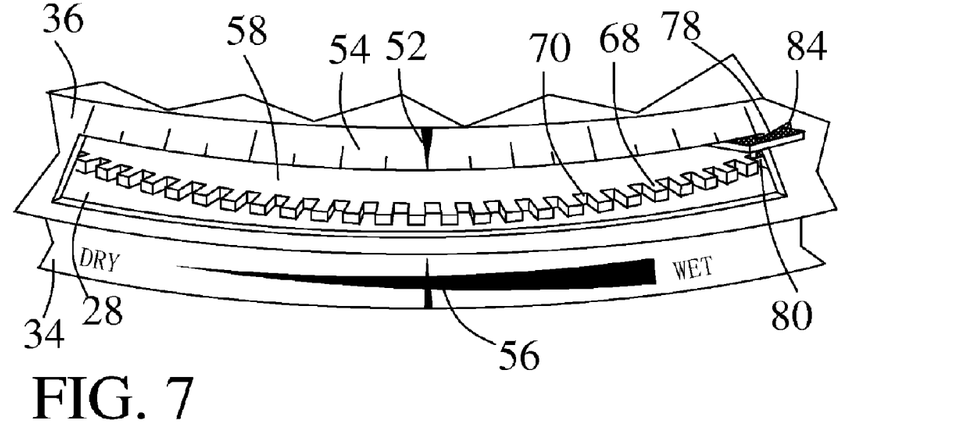
FIG. 7 is a fragmentary perspective view of the apparatus with the indicating system of FIG. 6, showing an indicating arm placed in storage position.
Figure 8:
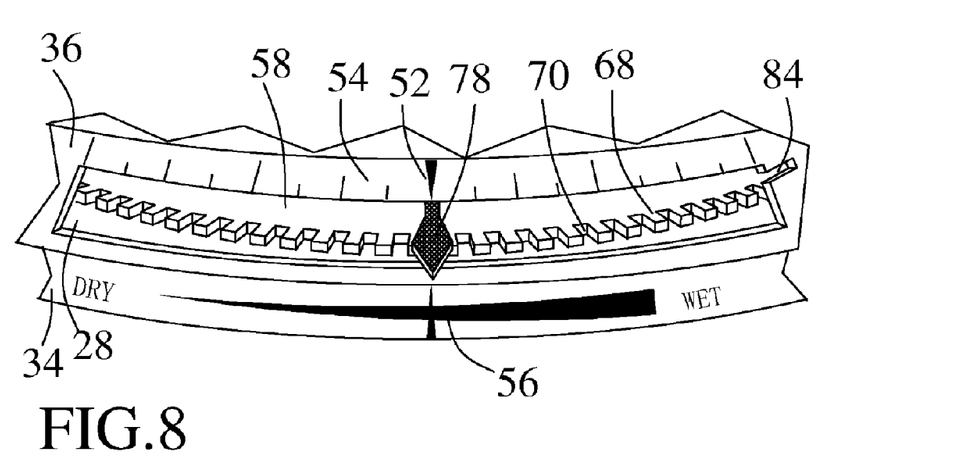
FIG. 8 is a fragmentary perspective view of the apparatus with the indicating system of FIG. 6, showing the indicating arm adjusted to the balanced position.

FIG. 6-8 show another adjustable indicating system in a second preferred embodiment of the present invention. The weighing mechanism employed in the apparatus is structurally the same as described in FIG. 2 so that it is omitted. The adjustable indicating system is structurally different from that described in FIG. 4. As shown in FIG. 6, the indicating system comprises a disc 58 and an indicating arm 60. The disc 58 is mounted on a support plate 62 which comprises a boss 64, an extending colunm 66, and four protrusions 48. The disc 58 has a series of radially extending teeth 68 on the periphery thereof and a series of slots 70 formed between two adjacent teeth 68. The disc 58 further comprises a central hole 72 for receiving boss 64 and four holes 46 for receiving protrusions 48 on support plate 62. The indicating arm 60 comprises a pivotal end 74 having a pivoting hole 76 and an arrow end 78 having a downwardly extending clip 80. The extending clip 80 is capable of falling into and retaining in any slot 70. The indicating arm 60 is disposed on boss 64 passing through extending colunm 66 through pivotal hole 76 and rotatably mounted between boss 64 and a cap 82.

The arrow end 78 has two positions including a storage position and an indicating position. In the storage position, the arrow end 78 is placed into a recess 84 formed on one side of opening 28 and the extending clip 80 is raised off from slot 70 on disc 58 so that disc 58 may rotate freely on either direction, as shown in FIG. 7. To be set in the indicating position, the arrow end 78 can be slid out of recess 84 and rotated to the balanced position without affecting the state of disc 58. The arrow end 78 is retained in position by clip 80 which falls into and retains in slot 70 between two adjacent teeth 68, as shown in FIG. 8. The marker 52 indicating the balanced position may be provided on skirt 36 above opening 28. Weighing indicia 54 may be calibrated and positioned on skirt 36 above opening 28. Explanatory indicia 56 may be arbitrarily calibrated and positioned on sidewall 34 below opening 28.

In use, the arrow end 78 is placed in the storage position when the apparatus is loaded with the pot holding the houseplant. After the houseplant is properly watered, the arrow end 78 is adjusted to the balanced position and retains in the indicating position. When the pot loses water due to evaporation and use by the houseplant, the arrow end deflects and indicates the weight change through weighing indicia 54 and the soil moisture level change through explanatory indicia 56.

Figure 9:
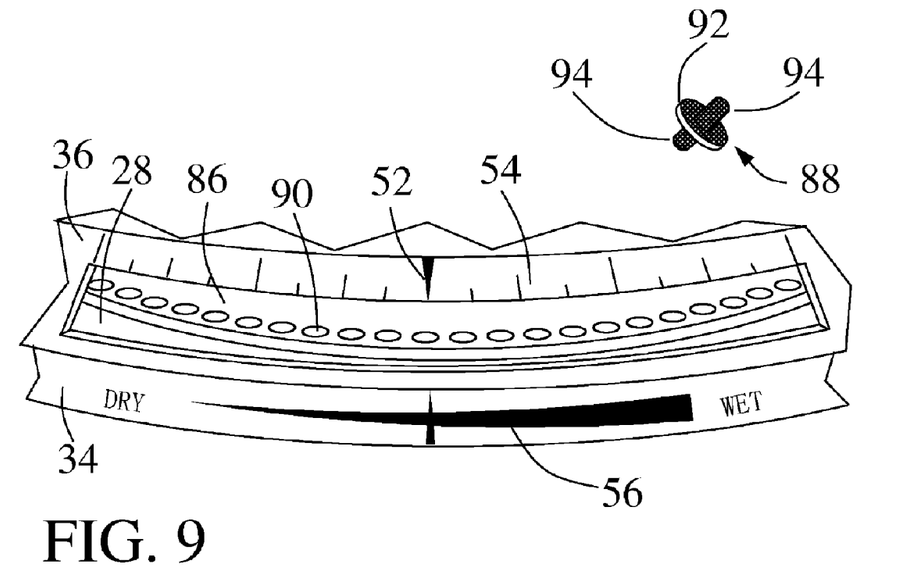
FIG. 9 is a fragmentary perspective view of a third preferred embodiment of the present invention, showing an adjustable indicating system with a separate marking insert.
Figure 10:
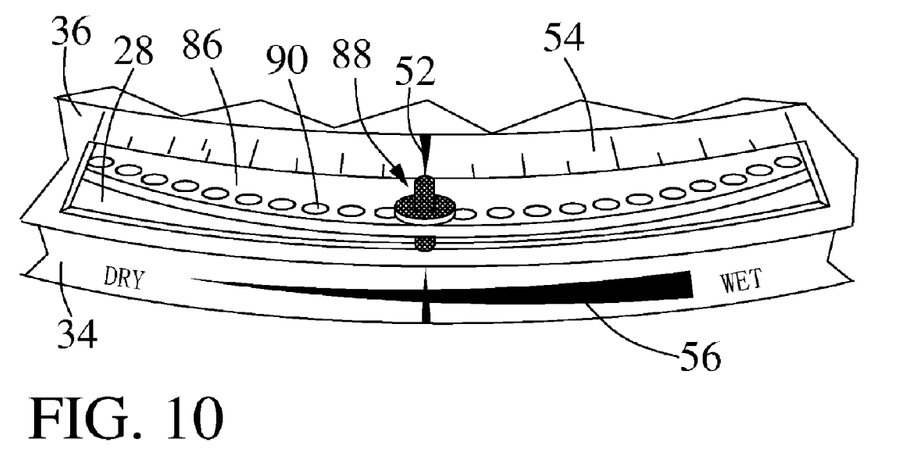
FIG. 10 is a fragmentary perspective view of an apparatus with the indicating system of FIG. 9, showing the marking insert inserted and held in the balanced position.

FIG. 9-10 show a third preferred embodiment of the present invention. The weighing mechanism employed in the apparatus is structurally the same as described in FIG. 2 so that it is omitted. The indicating system is structurally different from those described previously. The indicating system comprises a disc 86 which is mounted on support plate 26 in a manner as described in FIG. 4 and a removable marking insert 88. The disc 86 has a series of round holes 90 along the periphery thereof. The marking insert 88 comprises a colored plate 92 as an indicator and at least one cylindrical post 94. The plate 92 is larger in size than round hole 90. The size of post 94 is slightly smaller than the size of round hole 90 such that post 94 may be inserted into any hole 90 along the periphery of disc 86. In FIG. 9, marking insert 88 comprises two posts 94 on each side for either post may be inserted into hole 90 and another may be utilized as a handle. The marker 52 indicating the balanced position may be provided on skirt 36 above opening 28. Weighing indicia 54 may be calibrated and positioned on skirt 36 above opening 28. Explanatory indicia 56 may be arbitrarily calibrated and positioned on sidewall 34 below opening 28.

In use, the apparatus is loaded with a potted houseplant. After the houseplant is properly watered, the insert 88 is inserted to one hole 90 corresponding to the balanced position to start monitoring soil moisture level as shown in FIG. 10.

Figure 11:
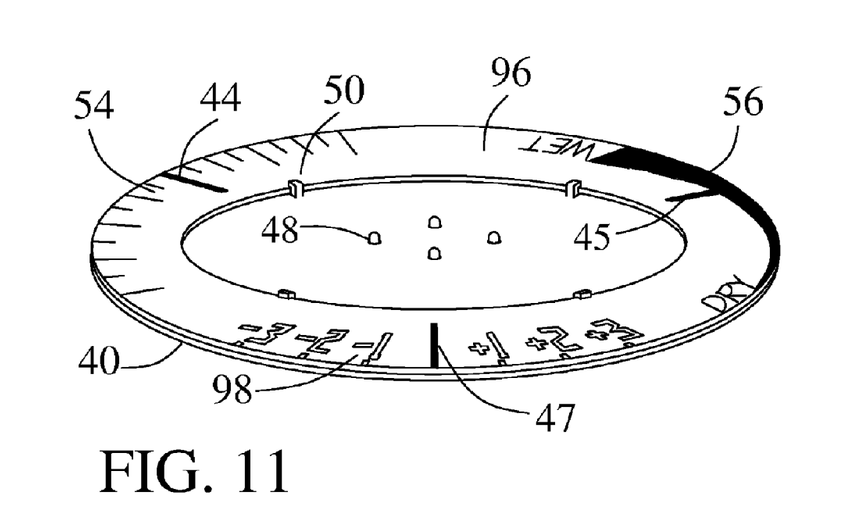
FIG. 11 is a front elevation view, with parts combined, of an adjustable indicating system in a fourth preferred embodiment of the present invention.
Figure 12:
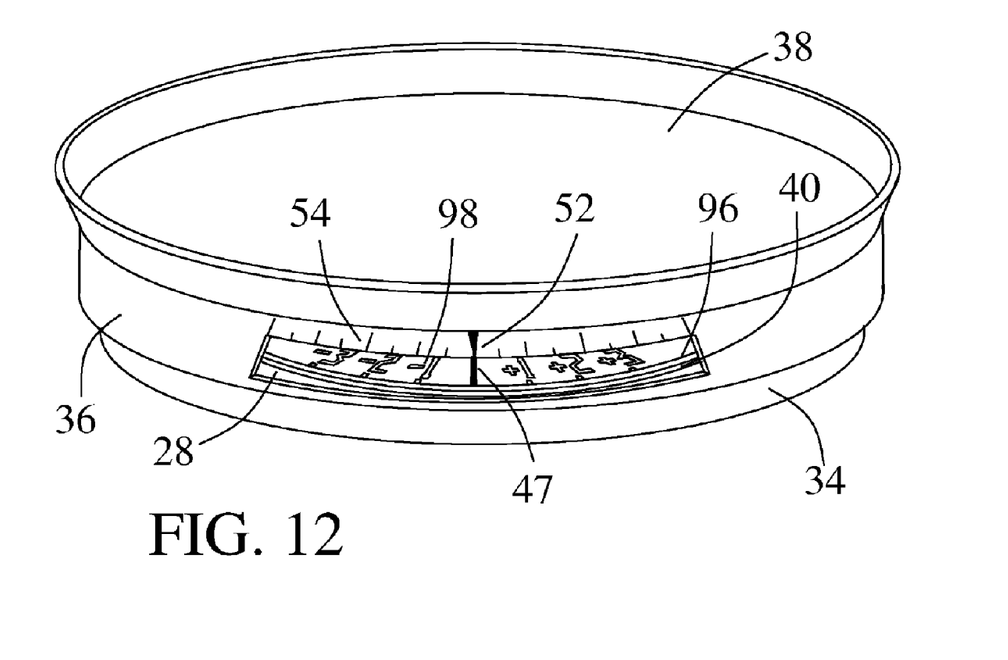
FIG. 12 is a perspective view of the fourth preferred embodiment of the present invention.

FIG. 11 shows an adjustable indicating system in a fourth preferred embodiment of the present invention. The weighing mechanism employed in the apparatus is structurally the same as described in FIG. 2 so that it is omitted. The indicating system comprises disc 40 and a washer-like plate 96 with outer diameter substantially the same as disc 40. The disc 40 is mounted by four protrusions 48 on support plate 26 and the washer-like plate 96 is rotatably mounted on disc 40 in a manner described in FIG. 4B. The balanced position marker 52 may be provided above opening 28. The indicator 44 is provided on washer-like plate 96. Weighing indicia 54 may be calibrated and positioned on both sides of indicator 44 on washer-like plate 96. The indicia on one side indicate weight decrease. The indicia on the other side indicate weight increase. It should be indicated that, in addition to weighing indicia 54, other types of indicia may be provided simultaneously on washer-like plate 96. As shown in FIG. 11, explanatory indicia 56 and relative moisture indicia 98 are separately positioned on washer-like plate 96. An indicator 45 is provided on washer-like disc 96 for explanatory indicia 56 and an indicator 47 is provided for relative moisture indicia 98. The explanatory indicia 56 may be arbitrarily calibrated to soil moisture level and ranged from WET to DRY with indicator 45 at the middle. The relative moisture indicia 98 may be arbitrarily calibrated and positioned on both sides of indicator 47 to represent moisture level increases in +1, +2,+3 and decreases in −1, −2, −3. Multiple of relative moisture indicia can be provided on washer-like plate 96 and each indicia may be calibrated according to different watering requirements of various types of houseplants. An additional set of weighing indicia 54 may be provided on skirt 36 above opening 28 such that the weight change can always be checked as shown in FIG. 12.

In use, the apparatus is placed under a pot holding a houseplant. After the houseplant is properly watered, a caretaker may manually adjust washer-like plate 96 to select and display one of the indicia.

The apparatus of the present invention can be utilized to measure the exact amount of water needed in the pot for proper soil moisture level. To do this, the houseplant is potted with the soil having a minimal moisture level and placed under the apparatus. Before watering, the caretaker may manually adjust the indicator to the balanced position. When the houseplant is properly watered, the apparatus indicates the exact amount of water added in the pot.

The opening and the exposed parts of the adjustable indicating system may be encased in a transparent housing for both protective and aesthetical purposes. The size and the shape of the housing may be configured to encase the convex outline of the exposed portion of the indicating system. The housing can be opened to allow accessing and adjusting the indicator therein and be closed to protect the encased parts. The portion of the housing corresponding to the opening may be made of magnifying lens such that the indicator is easily checked from above or from the side. The housing may be made of plastic or other transparent materials. The techniques for encasing the indicating system with the transparent housing are well known to those skilled in the art.

Usually, the indicating system only needs to be initially adjusted and it retains in position thereafter. The indicating system needs to be readjusted only if the houseplant is repotted, or the weight of the houseplant increases significantly due to growth.

The key structure of the adjustable indicating system is composed of a rotatable disc mounted on a deflection transmitting system and an adjustable indicating component on the disc to form an indicator. It is contemplated that other ways may be employed for making the indicating system adjustable. For example, an adjustable indicating system may comprise a rotatable disc and a colored clip. The colored clip may be clipped onto a balanced position along the outer edge of the rotatable disc after the apparatus is loaded with a pot holding houseplants. The colored clip on the rotatable disc forms an indicator and indicates the weight change of the pot holding houseplants. In essence, the adjustable indicating system can be of any embodiment so long as it comprises a rotatable disc mounted on a deflection transmitting system and an adjustable indicating component which is capable of being adjusted to and retained on any indicating position on the disc.

In conclusion, herein is presented an apparatus methed for continuously monitoring the weight change of an object by means of a visual indicator. Accordingly, the present invention can be used to monitor changes in soil moisture level in a pot holding houseplants. As the loss of the water content in the soil is indicated, a caretaker may add adequate amount of water to the soil by balancing the weight change to restore the adequate soil moisture level.

As the novel feature of the present invention, the adjustment of the indicating component is independent of the movement of the disc and the other parts of the weighing mechanism. Thus the indicating component can be adjusted to the balanced position after the apparatus is loaded with a pot holding houseplants so that indication of the weight change will be apparent and easily readable. The characteristics of the present invention can also be employed to measure the weight change for other objects. For example, the present invention may be adapted to monitor gas in a cylinder in use, liquid evaporation in a vessel, or gas escape in a container during long-term storage where the weight per se is of less importance. The size of the apparatus may vary to fit different sizes of containers.

The components of weighing mechanism may be made of metal, plastic, or other like materials. For use to monitor soil moisture level of a potted houseplant, the weighing platform may be a configuration of a pot base. The apparatus may also be integrally formed with a pot. The disc, the washer-like plate, and the indicating arm may be made of plastic, aluminum, or other like lightweight sheet material. The insert and other indicating components may be made of lightweight materials and made of structurally hollowed configuration. All the components are inexpensive, easily accessible, and easily assembled.

It should be understood that various changes and modifications to the presently preferred embodiments described herein will be apparent to those skilled in the art. Such changes and modifications may be made without departing from the spirit and scope of the present invention and without diminishing its attendant advantages. It is therefore intended that such changes and modifications be covered by the appended claims.

What is claimed is:

1. An adjustable indicating system, in combination with a weighing apparatus, said weighing apparatus comprising levers actuating a rotatable shaft via a rack and pinion arrangement and capable of sensing weight, comprising:

a disc comprising a series of restricting members along the periphery of said disc, wherein the disc is mounted directly on the shaft and rotates with the shaft when the shaft is actuated; and an adjustable indicating arm having a pointed arrow end with a downwardly extending clip directly attached to an underside of the arrow end, and an attachment end having an opening, said rotatable shaft extending through said opening in said attachment end of said indicating arm, the arrow end of the indicating arm having a storage position and an indicating position;

wherein the indicating arm is rotatably mounted on the shaft via the opening in the attachment end of the indicating arm such that the movement of the arrow end between the storage position and the indicating position is independent of the movement of the shaft;

wherein the restricting members comprise a series of radially extending teeth and slots formed by two adjacent respective teeth; wherein in the indicating position the extending clip extends into and retains in one of the slots such that the arrow end retains on the disc forming an indicator along the periphery of the disc and when in the indicating position the indicating arm rotates in conjunction with the disc; wherein in the storage position the extending clip is raised out from the slot such that the disc is capable of rotating freely with respect to said indicating arm;

wherein the indicating system is so positioned that a portion of the disc and the indicating arm are directly exposed through a side opening of the weighing apparatus;

whereby the indicating arm is grasped and adjusted by hand through the side opening of the weighing apparatus so that the adjustment of the indicating arm is independent of the movement of the disc in said storage position.

2. An apparatus, for use under an object for monitoring weight change of the object, comprising:

a bottom base carrying a weighing platform;

a weighing mechanism comprising a weight sensing system capable of sensing weight and a deflection transmitting system capable of actuating a rotatable shaft via a rack and pinion arrangement, the weighing mechanism disposed between the bottom base and the weighing platform; and an adjustable indicating system comprising a disc having a series of restricting members along the periphery of said disc, and an adjustable indicating arm having a pointed arrow end with a downwardly extending clip directly attached to an underside of the arrow end and an attachment end having an opening, said rotatable shaft extending through said opening in said attachment end of the indicating arm, the arrow end of the indicating arm having a storage position and an indicating position;

wherein the disc is mounted directly on the shaft and rotates with the shaft when the shaft is actuated; wherein the restricting members comprise a series of radially extending teeth and slots formed by two adjacent respective teeth;

wherein the indicating arm is rotatably mounted on the shaft via the opening in the attachment end of the indicating arm such that the movement of the arrow end between the storage position and the indicating position is independent of the movement of the shaft;

wherein in the indicating position the extending clip extends into and retains in one of the slots such that the arrow end retains on the disc forming an indicator along the periphery of the disc and when in the indicating position the indicating arm rotates in conjunction with the disc; wherein in the storage position the extending clip is raised out from the slot such that the disc is capable of rotating freely with respect to said indicating arm;

wherein the indicating system is so positioned that a portion of the disc and the indicating arm are directly exposed through a side opening of the weighing apparatus;

whereby the indicating arm is grasped and adjusted by hand through the side opening of the weighing apparatus so that the adjustment of the indicating arm is independent of the movement of the disc in said storage position.

* * * * *